US008454284B2

(12) United States Patent
Waggle et al.

(10) Patent No.: US 8,454,284 B2

(45) Date of Patent: Jun. 4, 2013

(54) MILLING CUTTER COUPLING SYSTEM

(75) Inventors: James M. Waggle, Derry, PA (US); Kevin M. Gamble, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 806 days.

(21) Appl. No.: 12/624,557

(22) Filed: Nov. 24, 2009

(65) Prior Publication Data

US 2010/0133761 A1 Jun. 3, 2010

Related U.S. Application Data

(60) Provisional application No. 61/118,865, filed on Dec. 1, 2008.

(51) Int. Cl.
*B23C 5/26* (2006.01)
*B23B 51/12* (2006.01)

(52) U.S. Cl.
USPC ........................ 409/234; 408/239 A; 279/143

(58) Field of Classification Search
USPC ............... 409/234, 232; 408/239 A; 279/143, 279/141; 82/158, 160; 407/30
See application file for complete search history.

(56) References Cited

U.S. PATENT DOCUMENTS 4,242,020 A * 12/1980 Schmid ......................... 409/234
4,325,664 A 4/1982 Mori
4,604,010 A * 8/1986 Reeves .......................... 409/233
5,110,240 A 5/1992 Zeilinger et al.
5,848,858 A * 12/1998 Jager et al. .................... 409/232
5,915,896 A * 6/1999 Koczarski et al. ............ 409/232
6,062,779 A 5/2000 Sugimura
6,553,876 B2 * 4/2003 Hochuli et al. ................. 82/147
7,101,128 B2 9/2006 Hansson
7,165,922 B2 1/2007 Inuzuka
7,270,506 B2 9/2007 Guy
2007/0079489 A1 4/2007 Cirino
2007/0231097 A1 10/2007 Ballas et al.

FOREIGN PATENT DOCUMENTS

EP 592694 A1 * 4/1994
FR 896991 3/1945
GB 834490 5/1960
GB 2265849 A * 10/1993
JP 55058910 5/1980
JP 09155625 6/1997
WO WO 99/11411 3/1999
WO 2007015256 2/2007

* cited by examiner

*Primary Examiner* — Erica E Cadugan
(74) *Attorney, Agent, or Firm* — Larry R. Meenan, Esq.

(57) ABSTRACT

A coupling system for mounting a cutting apparatus to a machine tool having a cutting apparatus and an adapter. The cutting apparatus has a first mounting flange having either a central bore or a central boss. The adapter has a second mounting flange having the other of a central bore or a central boss. The central boss on one of the mounting flanges forms a mating engagement with the central bore of the other mounting flange to align the two mounting flanges at a common center when the cutting apparatus is connected to the adapter. Additionally, each mounting flange may have at least one of a post or a groove located between an outer perimeter of the mounting flange and the central bore or central boss. When the cutting apparatus is connected to the adapter, at least one of the posts forms a mating engagement with a corresponding groove.

17 Claims, 8 Drawing Sheets

R 47 42 41 51 46 25 23 21 52 40 45 48 43 50 44 26 29 22 19 60 20 C 24

40
43
45
46
47
48
49
50
51
52
53
R 20
60
33
28
27
32

20
60
33
28
27
31

20
60
33
25
28
27
31

20
33
25
28
27
60
30

20
60
40
41
42

20
60
40
41
42

20
60
40
41
42

20
60
40
41
42

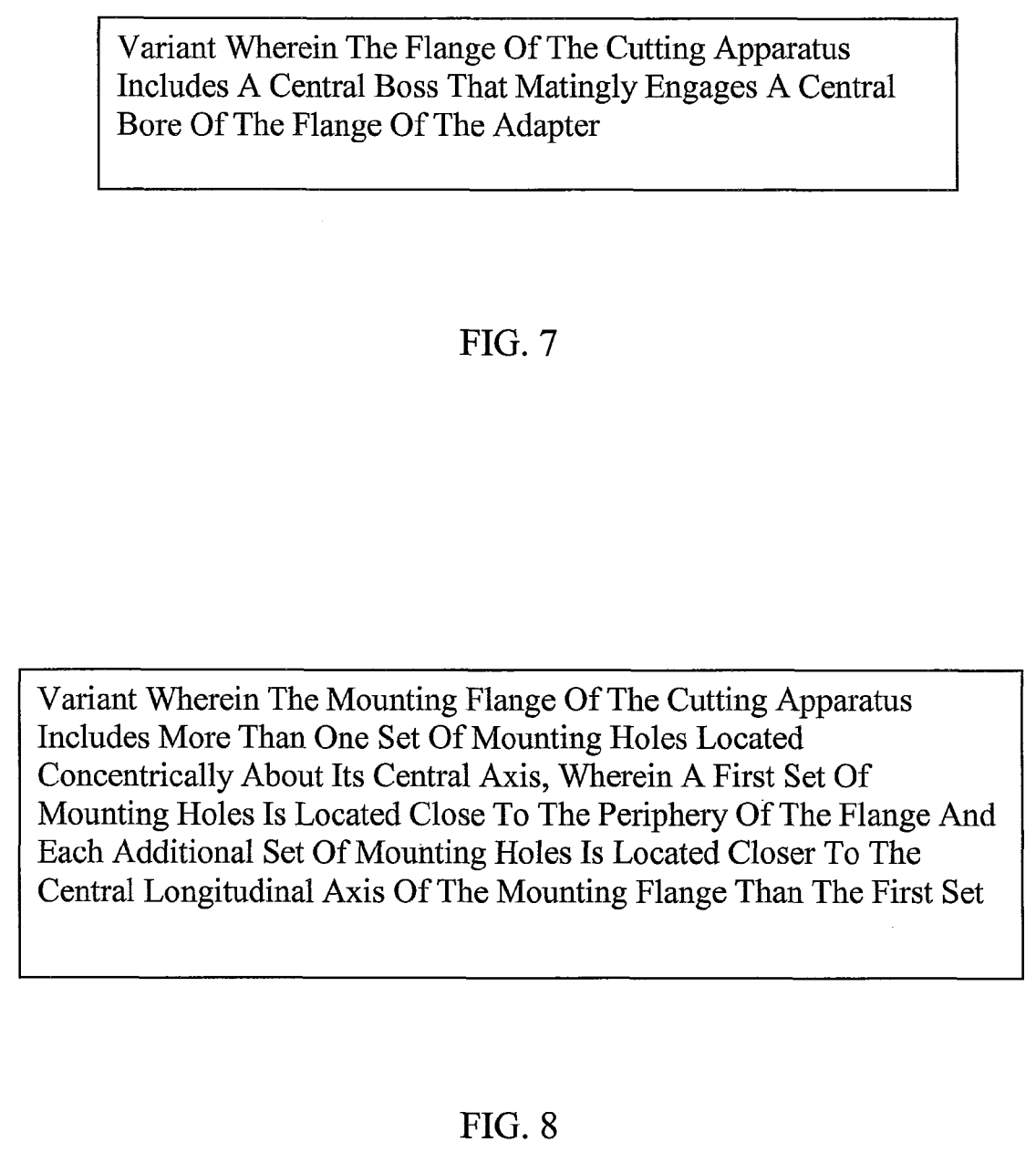

Variant Wherein The Flange Of The Cutting Apparatus Includes A Central Boss That Matingly Engages A Central Bore Of The Flange Of The Adapter

FIG. 7

Variant Wherein The Mounting Flange Of The Cutting Apparatus Includes More Than One Set Of Mounting Holes Located Concentrically About Its Central Axis, Wherein A First Set Of Mounting Holes Is Located Close To The Periphery Of The Flange And Each Additional Set Of Mounting Holes Is Located Closer To The Central Longitudinal Axis Of The Mounting Flange Than The First Set

FIG. 8

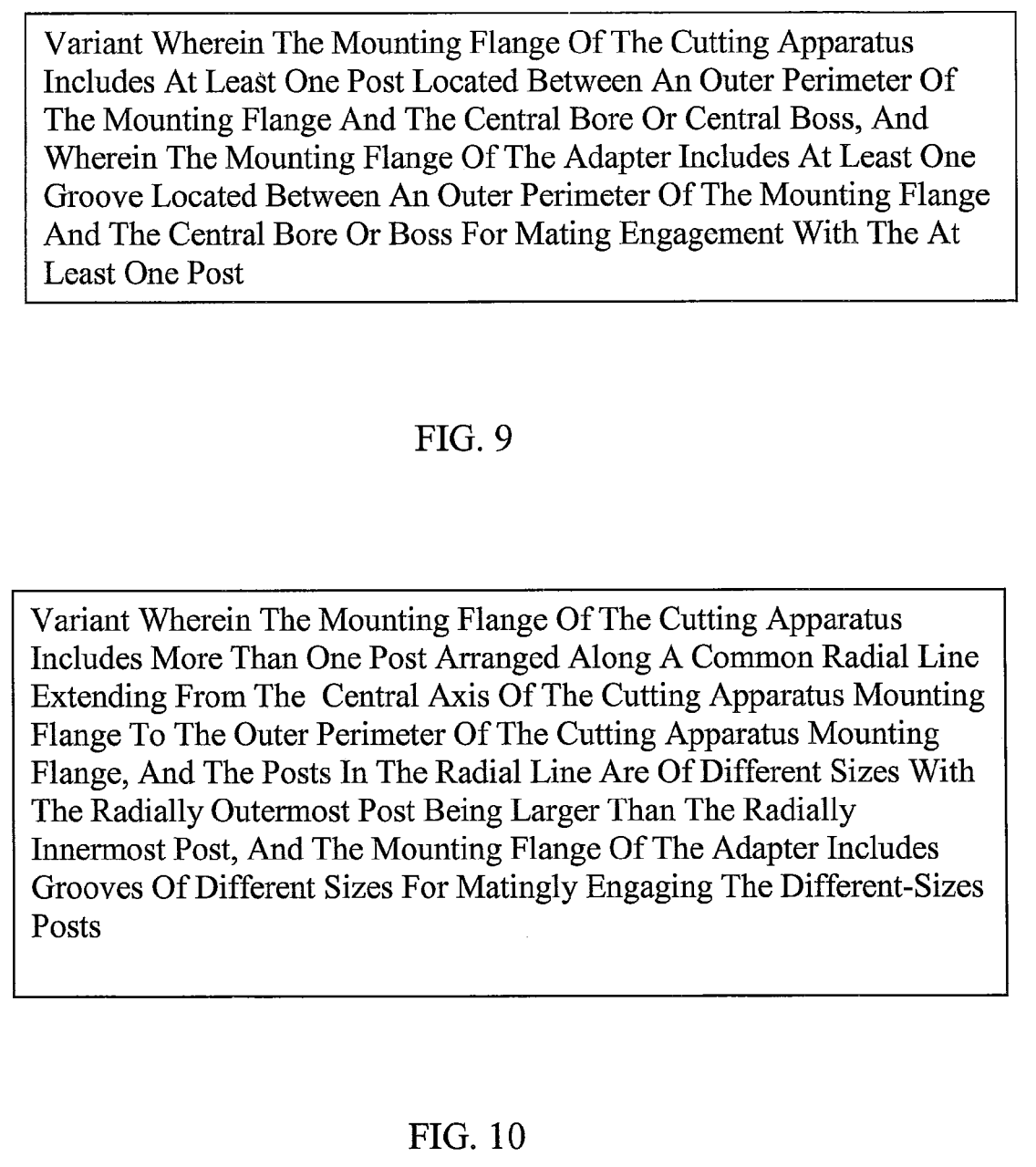

Variant Wherein The Mounting Flange Of The Cutting Apparatus Includes At Least One Post Located Between An Outer Perimeter Of The Mounting Flange And The Central Bore Or Central Boss, And Wherein The Mounting Flange Of The Adapter Includes At Least One Groove Located Between An Outer Perimeter Of The Mounting Flange And The Central Bore Or Boss For Mating Engagement With The At Least One Post

FIG. 9

Variant Wherein The Mounting Flange Of The Cutting Apparatus Includes More Than One Post Arranged Along A Common Radial Line Extending From The Central Axis Of The Cutting Apparatus Mounting Flange To The Outer Perimeter Of The Cutting Apparatus Mounting Flange, And The Posts In The Radial Line Are Of Different Sizes With The Radially Outermost Post Being Larger Than The Radially Innermost Post, And The Mounting Flange Of The Adapter Includes Grooves Of Different Sizes For Matingly Engaging The Different-Sizes Posts

FIG. 10

MILLING CUTTER COUPLING SYSTEM

CROSS REFERENCE TO RELATED APPLICATIONS

This application claims the benefit of priority of U.S. Provisional Patent Application No. 61/118,865, filed Dec. 1, 2008, which is incorporated herein by reference in its entirety.

BACKGROUND OF THE INVENTION

1. Field of the Invention

The present invention relates to a coupling system for connecting a rotating tool to an adapter. The adaptor is then connected to a machine tool. More specifically, the present invention relates to a coupling system having first and second mounting flanges integrally formed on a cutting apparatus and an adapter, respectively. A self-centering and highly stable connection between the flanges is established by multiple mating engagements between the mounting flanges.

2. Description of Related Art

Typical prior art coupling systems for mounting a rotating tool, for instance, a cutting apparatus such as an end mill, utilize a key screw extending radially through the shank of the adapter to engage the shaft of the tool in order to secure the tool to the adapter, transmit torque and prevent relative rotation between the tool and the adapter. However, as the key engages the shaft of the rotating tool, the key presses on the tool and causes the tool to become misaligned from the central axis of the adapter, which creates an error in fit between the bore of the adapter and the shaft of the rotating tool. Additionally, such systems have a small area of engagement between the tool and the adapter. The error in fit and small area of engagement reduce operational stability of the tool leading to unevenness during a cutting or machining operation and premature wear of the rotating tool and/or cutting inserts secured to the tool.

SUMMARY OF THE INVENTION

Accordingly, there is a general need in the art for a coupling system that allows a rotating tool to be attached to an adapter for mounting the tool to a machine tool that has a high degree of accuracy in centering the engagement between the tool and the adapter and provides increased operational stability of the rotating tool.

According to the present invention, a coupling system for mounting a cutting apparatus to a machine tool is provided. The coupling system has a cutting apparatus and an adapter. The cutting apparatus has a body with a first mounting flange at a first end integral with a cutting portion extending to a second end of the body. The first mounting flange has either a central bore extending at least partially through the flange or a central boss disposed on and extending from the first end. A plurality of mounting holes extend through the first mounting flange.

The adapter has a body with a second mounting flange integral with a shank extending to a second end of the body. The second mounting flange has one of the other of a central bore extending at least partially through the flange or a central boss disposed on and extending from the first end. A plurality of mounting holes extend at least partially through the second mounting flange.

The central boss on one of the mounting flanges forms a mating engagement with the central bore of the other mounting flange to align the two mounting flanges at a common center when the cutting apparatus is connected to the adapter. A plurality of fasteners that extend through the mounting holes in the first mounting flange into the mounting holes in the second mounting flange are used to make this connection.

Additionally, each mounting flange may have at least one of a post or a groove located between an outer perimeter of the mounting flange and the central bore or central boss. When the cutting apparatus is connected to the adapter, at least one of the posts forms a mating engagement with a corresponding groove.

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIG. 7 schematically depicts a variant wherein the flange of the cutting apparatus includes a central boss that matingly engages a central bore of the flange of the adapter.

FIG. 8 schematically depicts a variant wherein the mounting flange of the cutting apparatus includes more than one set of mounting holes located concentrically about its central axis, wherein a first set of mounting holes is located close to the periphery of the flange and each additional set of mounting holes is located closer to the central longitudinal axis of the mounting flange than the first set.

FIG. 9 schematically depicts a variant wherein the mounting flange of the cutting apparatus includes at least one post located between an outer perimeter of the mounting flange and the central bore or central boss, and wherein the mounting flange of the adapter includes at least one groove located between an outer perimeter of the mounting flange and the central bore or boss for mating engagement with the at least one post.

FIG. 10 schematically depicts a variant wherein the mounting flange of the cutting apparatus includes more than one post arranged along a common radial line extending from the central axis of the cutting apparatus mounting flange to the outer perimeter of the cutting apparatus mounting flange, and the posts in the radial line are of different sizes with the radially outermost post being larger than the radially innermost post, and the mounting flange of the adapter includes grooves of different sizes for matingly engaging the different-sized posts.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
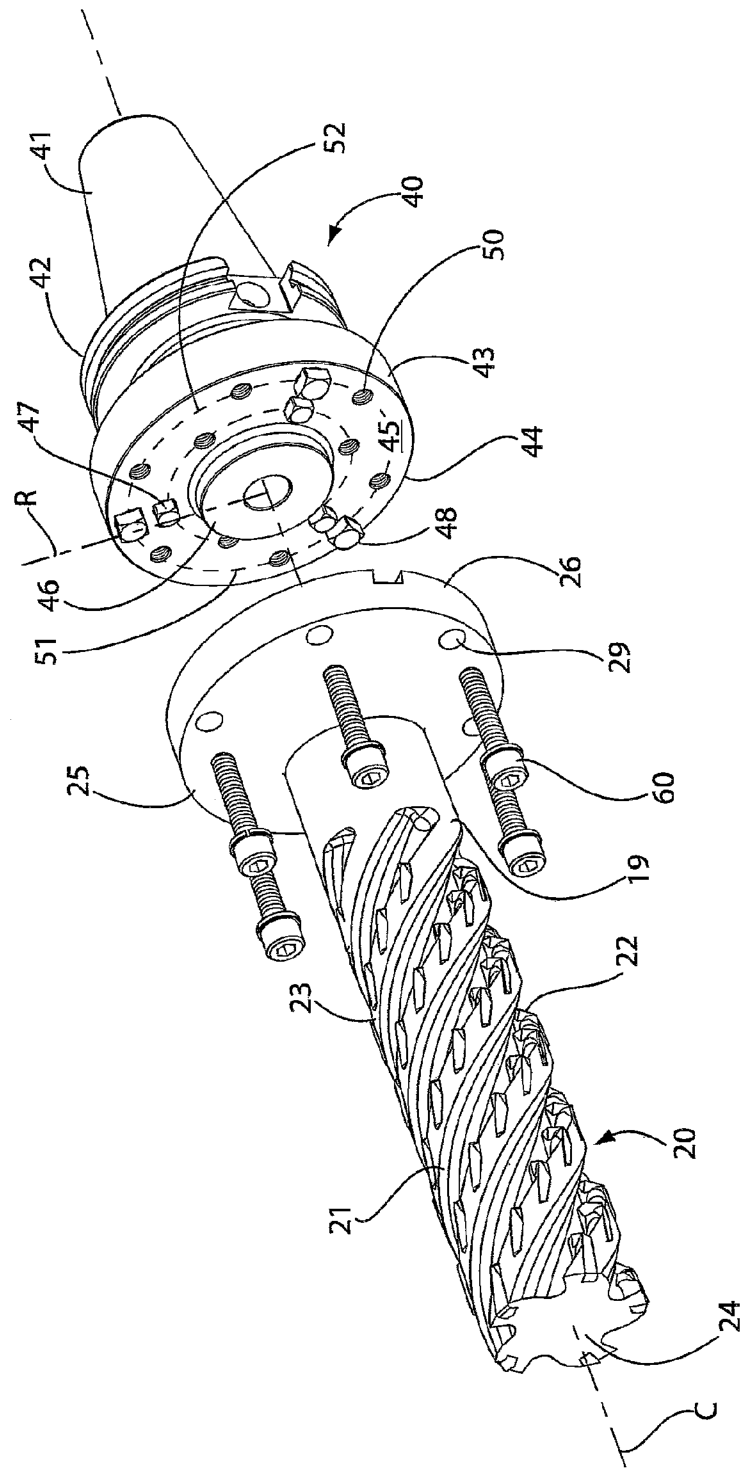
FIG. 1 depicts an exploded perspective view of a milling cutter coupling system according to an embodiment of the present invention.
Figure 2:
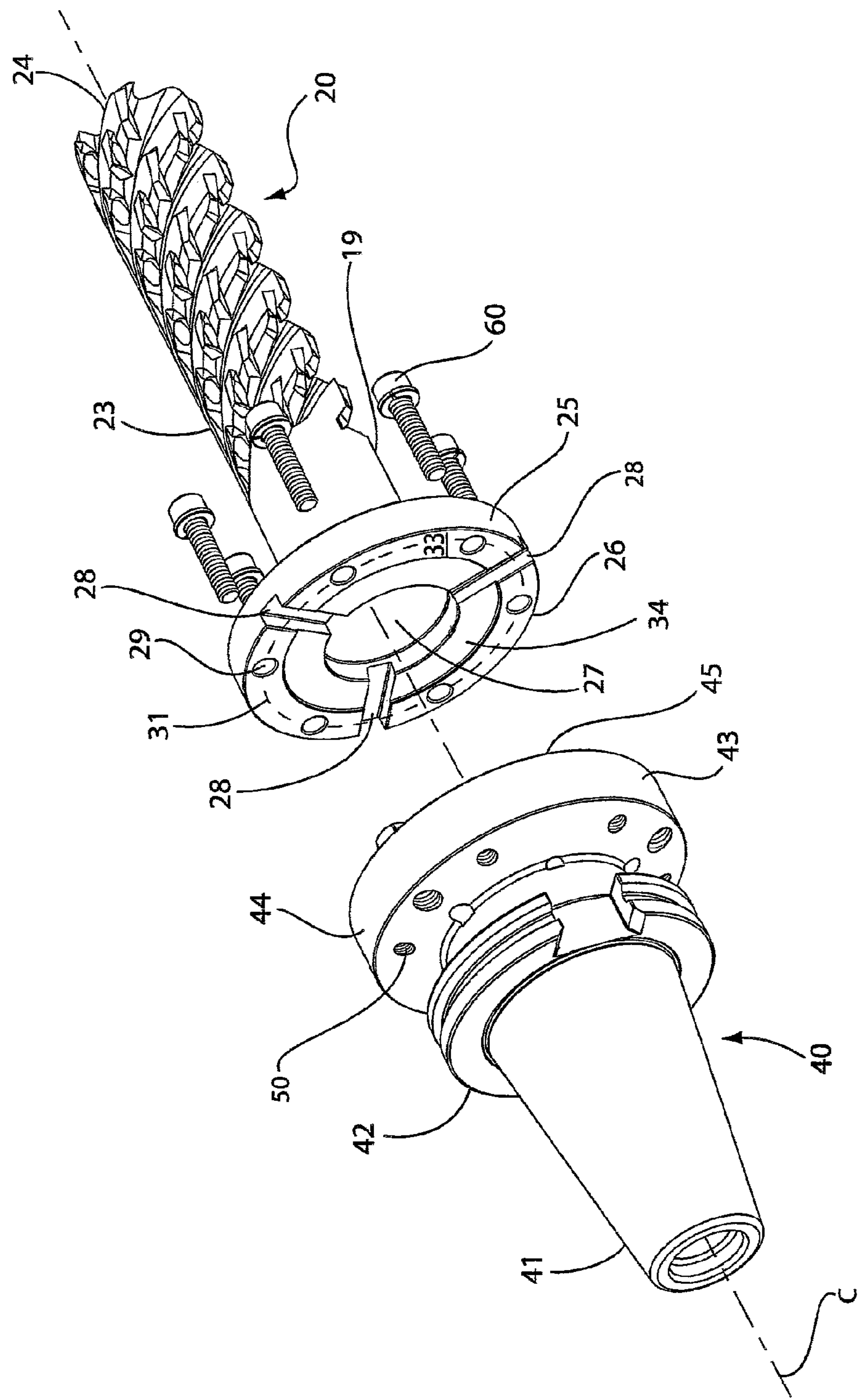
FIG. 2 depicts an exploded perspective view of the milling cutter coupling system from a reverse angle of the view depicted in FIG. 1.

Referring to FIGS. 1 and 2, a coupling system for mounting a cutting apparatus 20 to a machine tool (not shown), according to an embodiment of the present invention, is shown. The cutting apparatus 20, which is shown as an end mill, includes a body 19 with a first mounting flange 25 at a first end 26 integral with a cutting portion 23 extending to a second end 24 of the body 19. The cutting portion 23 includes a plurality of helical channels 22 running along the length of the cutting portion 23. A plurality of pockets is disposed along each helical channel 22. The pockets hold a number of carbide or ceramic cutting inserts 21 for performing a cutting operation on a workpiece. Though shown as an end mill, it is to be appreciated that the cutting apparatus 20 may be any type of rotating tool, such as a milling cutter or a drill, designed to be secured within an opening of a tool spindle of a machine tool by a removable adapter.

As shown in FIG. 2, the first mounting flange 25 includes a central bore 27 that extends at least partially through the first mounting flange 25, a plurality of grooves 28, particularly three grooves 28, extending from an outer perimeter of the first mounting flange 25 toward the central bore 27, and a plurality of mounting holes 29 extending through the first mounting flange 25 and disposed concentrically about the central bore 27 about the periphery of the first mounting flange 25. The first mounting flange 25 defines an end face 33 of the cutting apparatus 20, which extends from the outer perimeter of the first mounting flange 25 to the central bore 27.

Figures 5A, 5B, 5C, 5D:
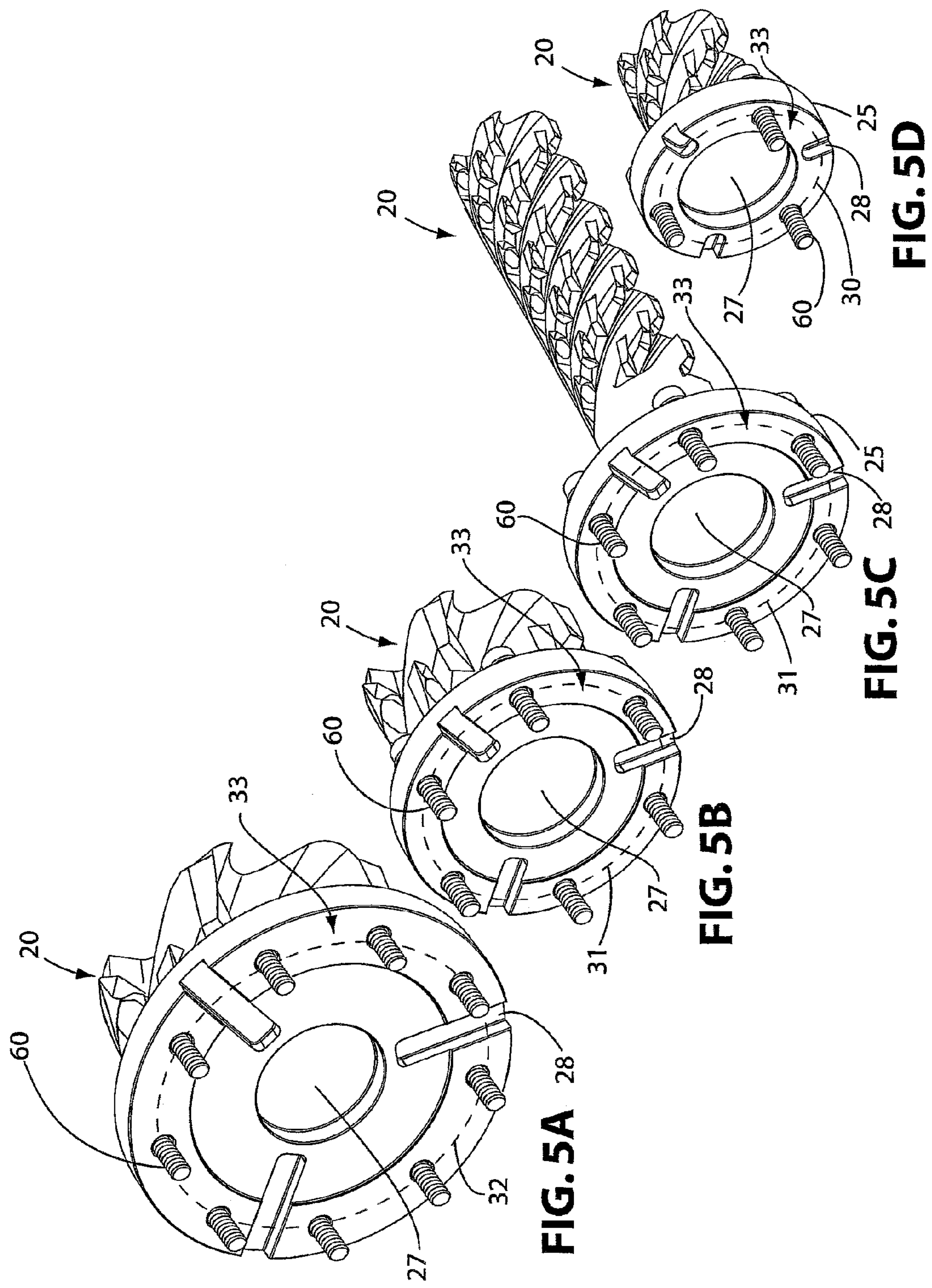
FIGS. 5A-5D depict perspective views of different sizes of cutting apparatus of the milling cutter coupling system.

According to alternative embodiments, the grooves 28 may extend across the entire width of the end face 33 from the outer perimeter of the first mounting flange 25 to the central bore 27 or may be terminated at an intermediate point, as is shown in FIG. 5D.

The coupling system also includes an adapter 40 that engages a mounting system (not shown) of the machine tool. The adapter 40, as shown in FIGS. 1 and 2, includes a tapered shank 41 adapted for engaging the machine tool and an intermediate flange 42 for automatic handling of the adapter 40. Mounting features, such as a threaded hole (not shown) may be disposed within the tapered shank 41 for attaching the adapter 40 to the machine tool. Further, the adapter 40 may include a bore extending through the adapter 40 for providing a flow of coolant material from the machine tool to the cutting apparatus 20. As shown, the adapter 40 is a CV-type adapter manufactured by Kennametal Inc. It is to be appreciated that the adapter 40 may be of any type known by those of ordinary skill in the art to be suitable for mounting a rotating tool to a machine tool, such as DV-, BT- or KM-type adapters manufactured by Kennametal Inc., CAPTO (Coromont) type adapters, or HSK-type adapters.

As shown in FIG. 1, the adapter 40 includes a second mounting flange 43 integrally formed at a first end 44 of the adapter 40. The second mounting flange 43 defines an end face 45 of the adapter 40. The second mounting flange 43 includes a central boss 46 disposed on and extending from the end face 45, a plurality of posts 47, 48 disposed on and extending from the end face 45 and arranged concentrically about the central boss 46, and a plurality of mounting holes 50 extending at least partially through the second mounting flange 43 and disposed concentrically about the central boss 46. The plurality of posts 47, 48 includes three sets of two posts 47, 48 wherein each set is arranged along a common radial line R extending from the central boss 46 toward the outer perimeter of the second mounting flange 43. The radially outermost posts 48 are of a larger size than the radially innermost posts 47 for purposes to be described below.

Figure 3:
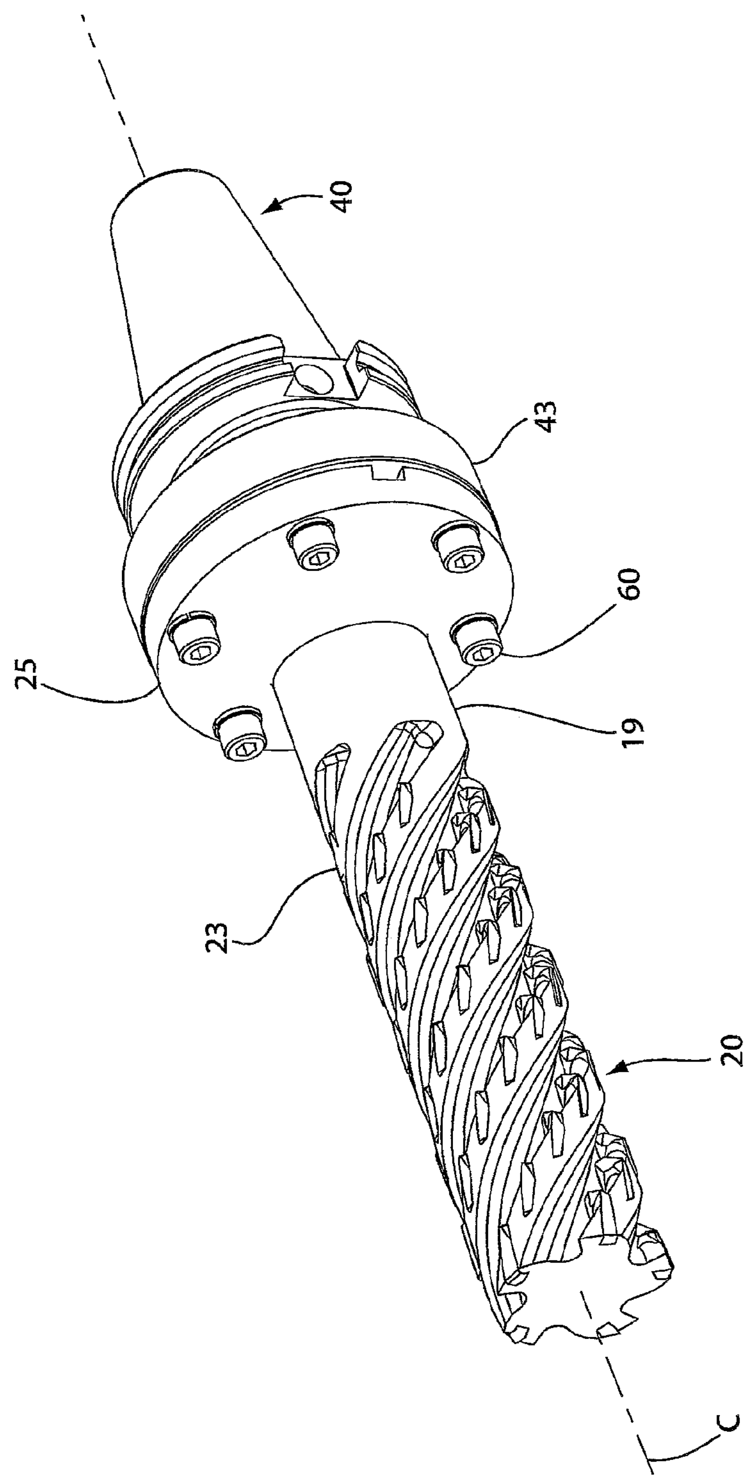
FIG. 3 depicts a perspective view of an assembled milling cutter coupling system.

With reference to FIGS. 1 and 2, the central boss 46 on the second mounting flange 43 forms a mating engagement with the central bore 27 in the first mounting flange 25. Likewise, at least one post from each set of posts 47, 48, particularly the radially outermost post 48, forms a mating engagement with respective grooves 28 of the first mounting flange 25. Thus, as shown in FIG. 2, the mating engagements of the central boss 46 with the central bore 27 and the posts 47, 48 with respective grooves 28 align the first mounting flange 25 on the cutting apparatus 20 and the second mounting flange 43 on the adapter 40 at a common center along the central axis C of the coupling system when the coupling system is assembled (FIG. 3).

Returning to FIG. 2, when the coupling system is assembled, it is desirable that the end face 33 of the cutting apparatus 20 be in flush engagement with the end face 45 of the adapter 40 perpendicular to the central axis C of the coupling system such that the cutting portion 23 of the cutting apparatus 20 is co-axial with respect to the machine tool. To that end, the central bore 27 of the first mounting flange 25 may include an internal beveled surface 34 extending inwardly from the end face 33 of the cutting apparatus 20 to avoid interference with the central boss 46 on the second mounting flange 43, which would result in a gap in the engagement between the respective end faces 33, 45. It is to be appreciated that the central boss 46 and central bore 27 may be reversed with the central boss 46 being formed on the first mounting flange 25 and the central bore 27 being formed in the second mounting flange 43.

The plurality of mounting holes 29 extending through the first mounting flange 25 are arranged in a concentric pattern about the central bore 27. At least a portion of the plurality of mounting holes 50 formed in the second mounting flange 43 are arranged in a corresponding concentric pattern about the central boss 46. The corresponding concentric patterns are aligned when the central boss 46 forms a mating engagement with the central bore 27 and the posts 47, 48 on the second mounting flange 43 form a mating engagement with respective grooves 28 in the first mounting flange 25. As shown in FIG. 1, the second mounting flange 43 also includes an inner concentric pattern of mounting holes 50 for purposes to be described below.

A plurality of fasteners 60 extend through the plurality of mounting holes 29 in the first mounting flange 25 into the plurality of mounting holes 50 in the second mounting flange 43 to attach the first mounting flange 25 to the second mounting flange 43. As shown, the plurality of fasteners 60 may be Allen screws engaging with corresponding threads in the mounting holes 50 of the second mounting flange 43, though it is to be appreciated that the fasteners 60 may be of any type known to be suitable by those of ordinary skill in the art.

It is to be appreciated that the corresponding engagements of the central boss 46 with the central bore 27, the plurality of posts 47, 48 with respective grooves 28, the corresponding alignment of the plurality of mounting holes 29, 50 and the surface-to-surface engagement of the respective end faces 33, 45 provides a much larger mounting surface attaching the cutting apparatus 20 to the adapter 40 and significantly increases mounting accuracy and operational stability of the cutting apparatus 20. Further, the plurality of posts 47, 48 on the second mounting flange 43 forms a mating engagement with respective grooves 28 in the first mounting flange 25 in a manner that allows the posts 47, 48 to transmit torque generated by the machine tool to the cutting apparatus 20. Additionally, the mating engagement of the posts 47, 48 with respective grooves 28 prevents relative rotation of the cutting apparatus 20 and the first mounting flange 25 with respect to the adapter 40 and the second mounting flange 43, maintains alignment between the cutting apparatus 20 and the adapter 40 and reduces shear strain on the plurality of fasteners 60 during operation of the machine tool.

According to an embodiment of the present invention, the posts 47, 48 are formed with protrusions (not shown) extending from one side thereof. The protrusions engage in an interference fit with holes drilled in the second mounting flange 43 at the end face 45 so as to attach the posts 47, 48 to the second mounting flange 43. According to an alternative embodiment, the posts 47, 48 and grooves 28 are not included in the coupling system and the plurality of fasteners 60, as well as frictional engagement between the respective end faces 33, 45, transmits torque from the machine tool to the cutting apparatus 20 via the adapter 40.

Figures 4A, 4B, 4C, 4D:
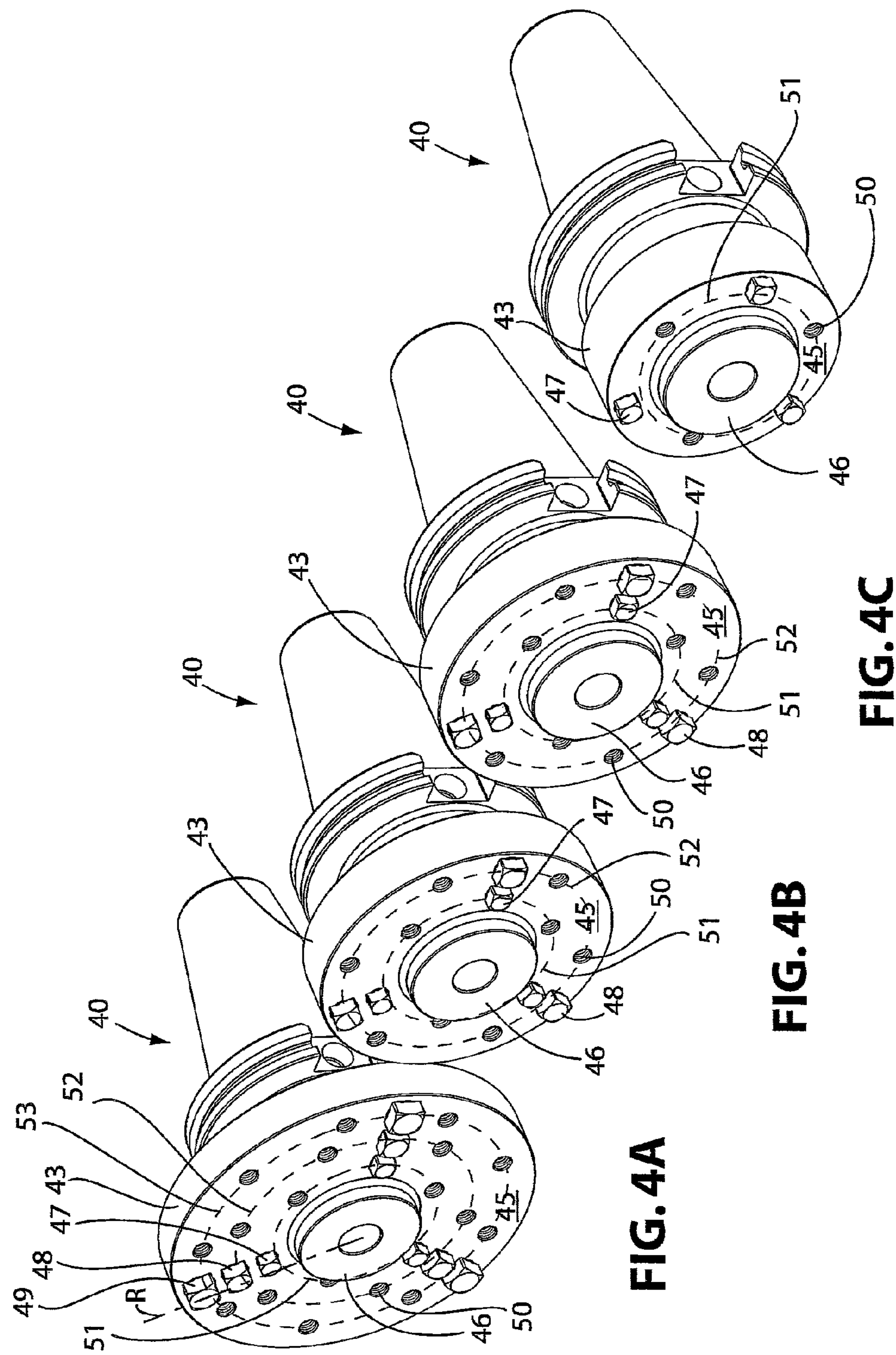
FIGS. 4A-4D depict perspective views of different sizes of adapter assemblies of the milling cutter coupling system.
Figures 6A, 6B, 6C, 6D:
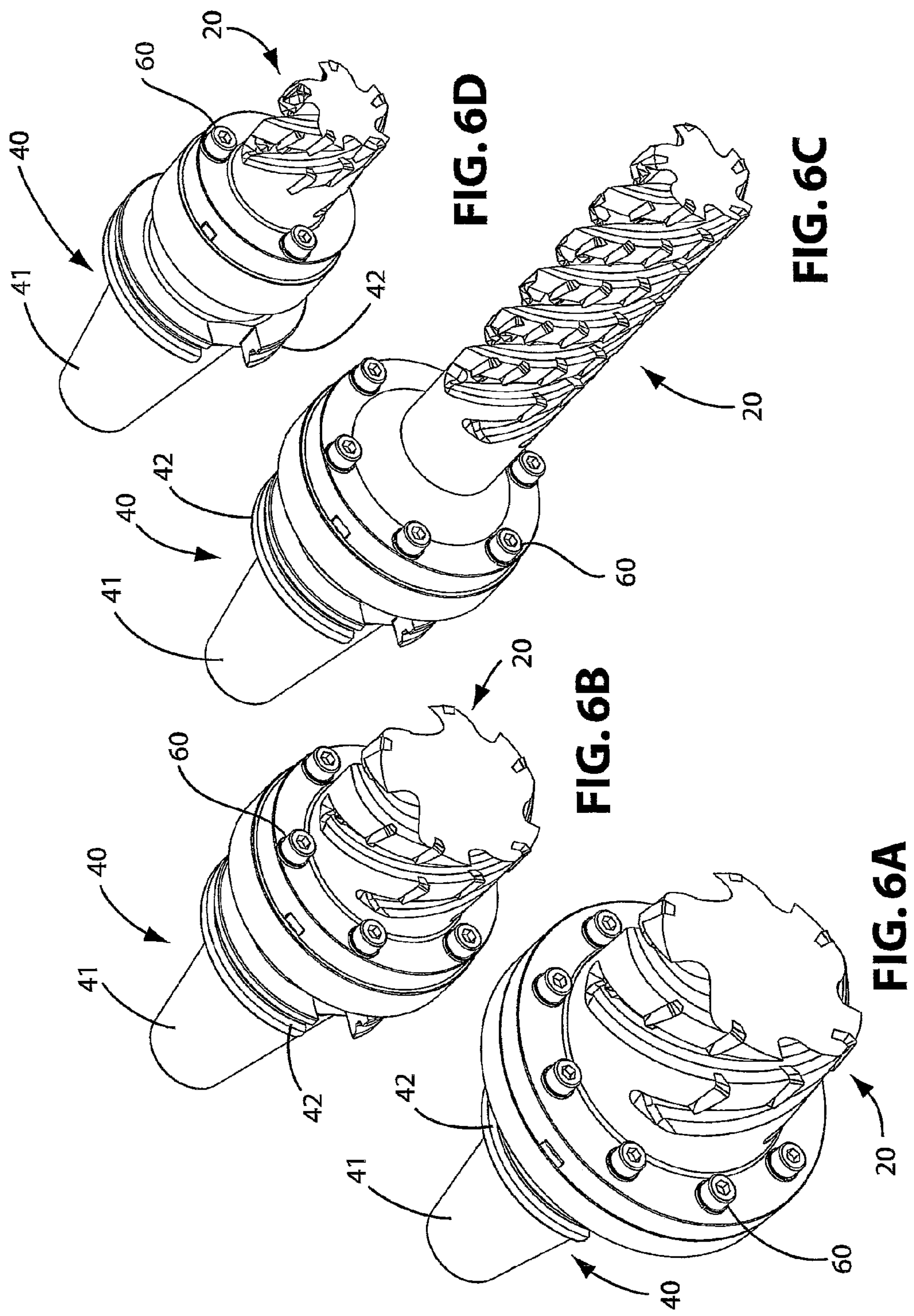
FIGS. 6A-6D depict perspective views of different sizes of assembled milling cutter coupling systems.

FIGS. 4-6 illustrate coupling systems of four different sizes according to an embodiment of the present invention. FIGS. 4A, 5A and 6A show a coupling system for a 4 in. diameter end mill cutting apparatus 20 and corresponding adapter 40. FIGS. 4B, 5B and 6B show a coupling system for a 3 in. diameter end mill cutting apparatus 20 and corresponding adapter 40. FIGS. 4C, 5C and 6C show a coupling system for a long 2 in. diameter end mill cutting apparatus and corresponding adapter 40. FIGS. 4D, 5D and 6D show a coupling system for a regular 2 in. diameter end mill cutting apparatus 20 and corresponding adapter 40. It is to be appreciated that the various coupling systems illustrated in FIGS. 4-6 are made according to the principles discussed hereinabove with reference to FIGS. 1-3 with certain variations between coupling systems of different sizes, which will be discussed below.

The mounting structures of the different sized adapters 40 are the same type and size such that they can be mounted to the same type and size of machine tool receiver. Likewise, the thicknesses of the first and second mounting flanges 25, 43, the diameters and thicknesses of the central bosses 46, and the size and structure of the central bores 27 may be the same throughout the illustrated coupling systems 10; however, it is not necessary.

With reference to FIGS. 4A, 5A and 6A, the coupling system for the 4 in. diameter end mill cutting apparatus 20 includes an adapter 40, shown in FIG. 4A, having a second mounting flange 43 of the same diameter as the diameter of the first mounting flange 25 for the 4 in. diameter end mill cutting apparatus 20 shown in FIG. 5A. The second mounting flange 43 includes a plurality of mounting holes 50 arranged in three concentric patterns 51, 52, 53 about the central boss 46. The outermost pattern 53 corresponds to the concentric pattern 32 of mounting holes 29 in the first mounting flange 25 on the 4 in. diameter end mill cutting apparatus 20 shown in FIG. 5A. The intermediate pattern 52 corresponds to the concentric patterns 31 of mounting holes 29 in the first mounting flanges 25 of the 3 in. diameter end mill cutting apparatus 20 shown in FIG. 5B and the long 2 in. diameter end mill cutting apparatus 20 shown in FIG. 5C. The innermost pattern 51 corresponds to the concentric pattern 30 of mounting holes 29 in the first mounting flange 25 of the 2 in. diameter end mill cutting apparatus 20 shown in FIG. 5D.

The second mounting flange 43 shown in FIG. 4A also includes a plurality of posts 47, 48, 49 arranged in three sets of three posts 47, 48, 49. Each set of posts is arranged along a radial line R (shown in FIG. 1) extending from the central boss 46 toward the outer perimeter of the second mounting flange 43. As a result, the second mounting flange 43 is capable of receiving the first mounting flange 25 from any of those cutting apparatuses 20 illustrated in FIGS. 5A-5D.

In particular, the radially outermost posts 49 are larger than the radially intermediate posts 48 and radially innermost posts 47 and correspond in size to the plurality of grooves 28 in the first mounting flange 25 of the 4 in. diameter end mill cutting apparatus 20, shown in FIG. 5A, such that the outermost posts 49 will form a mating engagement with respective grooves 28 of the 4 in. diameter end mill cutting apparatus 20. The radially intermediate posts 48 are larger than the radially innermost posts 47 and correspond in size to the plurality of grooves 28 in the first mounting flanges 25 of the 3 in. diameter end mill cutting apparatus 20, shown in FIG. 5B, and the long 2 in. diameter end mill cutting apparatus, shown in FIG. 5C, such that the intermediate posts 48 will form a mating engagement with respective grooves 28 of the 3 in. diameter end mill cutting apparatus 20 and the long 2 in. diameter end mill cutting apparatus 20. The radially innermost posts 47 correspond in size to the plurality of grooves 28 in the first mounting flange 25 of the 2 in. diameter end mill cutting apparatus 20, shown in FIG. 5D, such that the innermost posts 47 will form a mating engagement with respective grooves 28 of the 2 in. diameter end mill cutting apparatus 20.

Thus, it is to be appreciated that the adapter 40 shown in FIG. 4A is capable of having a cutting apparatus 20 mounted thereon with first mounting flanges 25 of equal or smaller diameters than the second mounting flange 43 of the adapter 40. To that end, the second mounting flange 43 has three concentric patterns 51, 52, 53 of mounting holes 50 that correspond to respective patterns 30, 31, 32 of mounting holes 29 in first mounting flanges 25 of three different sizes and at least three posts 47, 48, 49, which form a mating engagement with respective grooves 28 of first integral flanges 25 of three different sizes.

With reference to FIGS. 4B, 5B and 6B, the coupling system for the 3 in. diameter end mill cutting apparatus 20 includes an adapter 40, shown in FIG. 4B, having a second mounting flange 43 of the same diameter as the diameter of the first mounting flange 25 for the 3 in. diameter end mill cutting apparatus 20 shown in FIG. 5B. The second mounting flange 43 includes a plurality of mounting holes 50 arranged in two concentric patterns 51, 52 about the central boss 46. The outermost pattern 52 corresponds to the concentric patterns 31 of mounting holes 29 in the first mounting flanges 25 of the 3 in. diameter end mill cutting apparatus 20, shown in FIG. 5B, and the long 2 in. diameter end mill cutting apparatus 20, shown in FIG. 5C. The innermost pattern 51 corresponds to the concentric pattern 30 of mounting holes 29 in the first mounting flange 25 of the 2 in. diameter end mill cutting apparatus 20, shown in FIG. 5D.

The second mounting flange 43 shown in FIG. 4B also includes a plurality of posts 47, 48 arranged in three sets of two posts 47, 48. Each set of posts is arranged along a radial line R (shown in FIG. 1) extending from the central boss 46 toward the outer perimeter of the second mounting flange 43. The radially outermost posts 48 are larger than the radially innermost posts 47 and correspond in size to the plurality of grooves 28 in the first mounting flange 25 of the 3 in. diameter end mill cutting apparatus 20, shown in FIG. 5B, and the long 2 in. diameter end mill cutting apparatus, shown in FIG. 5C, such that the outermost posts 48 will form a mating engagement with respective grooves 28 of the 3 in. diameter end mill cutting apparatus 20 and the long 2 in. diameter end mill cutting apparatus 20. The radially innermost posts 47 correspond in size to the plurality of grooves 28 in the first mounting flange 25 of the 2 in. diameter end mill cutting apparatus

20, shown in FIG. 5D, such that the innermost posts 47 will form a mating engagement with respective grooves 28 of the 2 in. diameter end mill cutting apparatus 20.

Thus, it is to be appreciated that the adapter 40 shown in FIG. 4B is capable of having a cutting apparatus 20 mounted thereon with first mounting flanges 25 of equal or smaller diameters than the second mounting flange 43 of the adapter 40. To that end, the second mounting flange 43 has two concentric patterns 51, 52 of mounting holes 50 that correspond to respective patterns 30, 31 of mounting holes 29 in first mounting flanges 25 of two different sizes and at least two posts 47, 48, which form a mating engagement with respective grooves 28 of first integral flanges 25 of two different sizes.

With reference to FIGS. 4C, 5C and 6C, the adapter 40 shown in FIG. 4C is the same as the adapter 40 previously described above with respect to FIGS. 1-3 and is identical to the adapter 40 shown in FIG. 4B, previously discussed. Likewise, the long 2 in. diameter end mill cutting apparatus 20 shown in FIG. 5C and the adapter shown in FIG. 6C are the same as previously described above with respect to FIGS. 1-3. The long 2 in. diameter end mill cutting apparatus 20 is provided with a larger first mounting flange 25 and mounted to an adapter 40 having a larger second mounting flange 43 so as to provide greater operational stability to the cutting apparatus 20.

With reference to FIGS. 4D, 5D and 6D, the coupling system for the 2 in. diameter end mill cutting apparatus 20 includes an adapter 40, shown in FIG. 4D, having a second mounting flange 43 of the same diameter as the diameter of the first mounting flange 25 for the 2 in. diameter end mill cutting apparatus 20 shown in FIG. 5D. The second mounting flange 43 includes a plurality of mounting holes 50 arranged in a single concentric pattern 51 about the central boss 46. The pattern 51 corresponds to the concentric pattern 30 of mounting holes 29 in the first mounting flange 25 of the 2 in. diameter end mill cutting apparatus 20 shown in FIG. 5D.

The second mounting flange 43 shown in FIG. 4D also includes a plurality of posts 47 arranged concentrically about the central boss 46. The posts 47 correspond in size to the plurality of grooves 28 in the first mounting flange 25 of the 2 in. diameter end mill cutting apparatus 20, shown in FIG. 5D, such that the posts 47 will form a mating engagement with respective grooves 28 of the 2 in. diameter end mill cutting apparatus 20.

As shown in FIGS. 5A-D, the 4 in. diameter end mill cutting apparatus 20 is connected to the adapter 40 by nine fasteners 60, the 3 in. diameter end mill cutting apparatus 20 and the long 2 in. diameter end mill cutting apparatus are connected to the adapter 40 by six fasteners 60, and the 2 in. diameter end mill cutting apparatus 20 is connected to the adapter 40 by three fasteners 60.

According to an embodiment of the present invention, the cutting apparatus 20 and the adapter 40 are machined as integral pieces from steel according to any number of machining techniques known to those of ordinary skill in the art. The first mounting flange 25 of the cutting apparatus 20 is machined from the same workpiece as the cutting portion 23. Likewise, the second mounting flange 43 of the adapter 40, as well as the central boss 46, is machined from the same workpiece as the tapered shank 41 and intermediate flange 42.

While several embodiments of a milling cutter coupling system were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. A coupling system for mounting a cutting apparatus to an adapter that is configured to be secured within an opening of a tool spindle of a machine tool, the coupling system comprising:

the cutting apparatus, having a body with a first mounting flange at a first end of the body, the first mounting flange being integral with a cutting portion extending from the flange to a second end of the body, wherein the first mounting flange has one of a central bore extending at least partially through the first mounting flange or a central boss disposed on and extending from the first end, the cutting apparatus also having a plurality of mounting holes extending through the first mounting flange, the adapter having a body with a second mounting flange at a first end of the adapter body, the second mounting flange being integral with a shank extending to a second end of the adapter body, wherein the second mounting flange has the other of a central bore extending at least partially through the second mounting flange or a central boss disposed on and extending from the first end of the adapter body, the adapter also having a plurality of mounting holes extending at least partially through the second mounting flange, wherein the central boss on one of the mounting flanges forms a mating engagement with the central bore of the other mounting flange such that a central portion of the first mounting flange and a central portion of the second mounting flange form a mating engagement to align the first mounting flange and the second mounting flange at a common center, wherein a plurality of fasteners extend through the plurality of mounting holes in the first mounting flange into the plurality of mounting holes in the second mounting flange to attach the first mounting flange to the second mounting flange.

2. The coupling system according to claim 1, wherein the first mounting flange has the central bore and the second mounting flange has the central boss.

3. The coupling system of claim 1, where the mounting holes are arranged in a pattern that is concentric about the central axis of the coupling system.

4. The coupling system of claim 1, wherein at least the second mounting flange of the first and second mounting flanges has more than one set of mounting holes located about its central axis, wherein a first set of the mounting holes is located close to the periphery of the at least second mounting flange and each additional set of the mounting holes is located closer to the central axis of the at least second mounting flange than the first set is.

5. The coupling system of claim 1, wherein at least the second mounting flange of the first and second mounting flanges has more than one set of mounting holes located concentrically about its central axis, wherein a first set of the mounting holes is located close to the periphery of the at least second mounting flange and each additional set of the mounting holes is located closer to the central axis of the at least second mounting flange than the first set is.

6. A coupling system according to claim 1, wherein at least one portion of the first mounting flange has at least one post or at least one groove, and wherein and at least one portion of the second mounting flange has the other of at least one groove or at least one post, respectively, located such that each mounting flange has the at least one post or the at least one groove located between an outer perimeter of the respective mounting flange and the central bore or central boss thereof, and wherein the at least one post is in mating engagement with the corresponding at least one groove when the first mounting flange is attached to the second mounting flange.

7. The coupling system according to claim 6, wherein the first mounting flange has the at least one groove and the central bore and the second mounting flange has the at least one post and the central boss.

8. The coupling system of claim 6, where the mounting holes are arranged in a pattern that is concentric about the central axis of the coupling system.

9. The coupling system of claim 6, wherein the first mounting flange and the second mounting flange have the same diameter.

10. The coupling system of claim 6, wherein the first mounting flange has a diameter that is less than a diameter of the second mounting flange.

11. The coupling system of claim 6, wherein at least the second mounting flange of the first and second mounting flanges has more than one set of mounting holes located about its central axis, wherein a first set of the mounting holes is located close to the periphery of the at least second mounting flange and each additional set of the mounting holes is located closer to the central axis of the at least second mounting flange than the first set is.

12. The coupling system of claim 6, wherein at least the second mounting flange of the first and second mounting flanges has more than one set of mounting holes located concentrically about its central axis, wherein a first set of the mounting holes is located close to the periphery of the at least second mounting flange and each additional set of the mounting holes is located closer to the central axis of the at least second mounting flange than the first set is.

13. The coupling system of claim 6, wherein either of the mounting flanges has more than one of the posts, and the posts are arranged along a common radial line extending from the respective central axis of the respective flange to the outer perimeter of the respective flange.

14. The coupling system of claim 13, wherein the posts along the radial line are different sizes to form a mating engagement with a respective one of the at least one groove of different sizes, the grooves with which the posts along the radial line are engaged being different sizes.

15. The coupling system of claim 14, wherein the radially outermost post is larger than the radially innermost post.

16. The coupling system of claim 1, wherein the first mounting flange and the second mounting flange have the same diameter.

17. The coupling system of claim 1, wherein the first mounting flange has an outer diameter that is less than the outer diameter of the second mounting flange.

* * * * *